US012586898B2

(12) United States Patent
Varel et al.

(10) Patent No.: US 12,586,898 B2
(45) Date of Patent: Mar. 24, 2026

(54) POWER PLANES FOR A RADIO FREQUENCY (RF) METAMATERIAL ANTENNA

(71) Applicant: Kymeta Corporation, Redmond, WA (US)

(72) Inventors: Cagdas Varel, Seattle, WA (US); Steven Howard Linn, Hillsboro, WA (US)

(73) Assignee: KYMETA CORPORATION, Redmond, WA (US)

(*) Notice: Subject to any disclaimer, the term of this patent is extended or adjusted under 35 U.S.C. 154(b) by 489 days.

(21) Appl. No.: 18/098,598

(22) Filed: Jan. 18, 2023

(65) Prior Publication Data

US 2023/0238697 A1 Jul. 27, 2023

Related U.S. Application Data

(60) Provisional application No. 63/301,585, filed on Jan. 21, 2022.

(51) Int. Cl.

| | |
|---|---|
| ***H01Q 21/00*** | (2006.01) |
| ***H01Q 3/26*** | (2006.01) |
| *H01Q 1/28* | (2006.01) |
| *H01Q 3/36* | (2006.01) |

(52) U.S. Cl.

CPC ............... *H01Q 3/26* (2013.01); *H01Q 21/00* (2013.01); *H01Q 1/288* (2013.01); *H01Q 3/36* (2013.01); *H01Q 21/0031* (2013.01)

(58) Field of Classification Search

CPC .......... H01Q 3/26; H01Q 3/36; H01Q 21/064; H01Q 21/0031; H01Q 1/288; H01Q 15/0066; H01Q 15/0086

USPC .................................. 342/372; 343/700, 872

See application file for complete search history.

(56) References Cited

U.S. PATENT DOCUMENTS

| | | | | |
|---|---|---|---|---|
| 10,854,952 | B2 * | 12/2020 | Stevenson | H01Q 19/067 |
| 11,049,658 | B2 * | 6/2021 | Linn | H01G 4/30 |
| 11,450,953 | B2 * | 9/2022 | Pelletti | H01Q 15/0086 |
| 11,489,266 | B2 * | 11/2022 | Stevenson | H01Q 21/0012 |

(Continued)

FOREIGN PATENT DOCUMENTS

| | | | |
|---|---|---|---|
| CN | 213368219 | U | 6/2021 |
| TW | 202147695 | A | 12/2021 |
| TW | 202207528 | A | 2/2022 |

OTHER PUBLICATIONS

Office Action received for Taiwanese Patent Application No. 112102777, mailed on Oct. 4, 2024, 12 pages (5 pages of English Translation and 7 pages of Original Document).

(Continued)

*Primary Examiner* — Chuong P Nguyen

(74) *Attorney, Agent, or Firm* — Womble Bond Dickinson (US) LLP

(57) ABSTRACT

A radio-frequency (RF) antenna and method for using the same are disclosed. In some embodiments, an antenna includes an array of RF radiating antenna elements, a plurality of RF antenna element driving circuits coupled to the array of RF radiating antenna elements to supply tuning voltages to the RF radiating antenna elements, and one or more metal power planes, each of the one or more metal power planes coupled to supply a common voltage to two or more of the plurality of RF antenna driving circuits.

20 Claims, 8 Drawing Sheets

(56) References Cited

U.S. PATENT DOCUMENTS

| | | | | |
|---|---|---|---|---|
| 11,936,111 | B2 * | 3/2024 | Emanuelsson | H01Q 1/523 |
| 12,050,239 | B2 * | 7/2024 | Varel | H01Q 15/006 |
| 12,107,348 | B2 * | 10/2024 | Varel | H01Q 9/0414 |
| 12,316,001 | B2 * | 5/2025 | Chalabi | H01Q 25/002 |
| 2017/0324148 | A1 | 11/2017 | Stevenson et al. | |
| 2018/0182556 | A1 | 6/2018 | Linn et al. | |
| 2021/0296778 | A1 | 9/2021 | Varel et al. | |
| 2021/0351512 | A1 | 11/2021 | Varel et al. | |
| 2023/0295509 | A1 | 9/2023 | Wittek et al. | |
| 2023/0335911 | A1 * | 10/2023 | Varel | H01Q 21/08 |
| 2024/0291158 | A1 * | 8/2024 | Ranjbarnikkhah | H01Q 1/2283 |
| 2024/0313412 | A1 * | 9/2024 | Ranjbarnikkhah | H01Q 15/0086 |
| 2025/0105518 | A1 * | 3/2025 | Pham | H01Q 1/523 |

OTHER PUBLICATIONS

International Preliminary Report on Patentability received for PCT Patent Application No. PCT/US2023/011180, mailed on Aug. 2, 2024, 08 pages.

International Search Report and Written Opinion received for PCT Patent Application No. PCT/US23/11180, mailed on May 18, 2023, 10 pages.

Notice of Allowance received for Taiwanese Patent Application No. 112102777, mailed on May 2, 2025, 12 pages (6 pages of English Translation and 6 pages of Original Document).

* cited by examiner

POWER PLANES FOR A RADIO FREQUENCY (RF) METAMATERIAL ANTENNA

RELATED APPLICATION

The present application is a non-provisional application of and claims the benefit of U.S. Provisional Patent Application No. 63/301,585, filed Jan. 21, 2022 and entitled "POWER PLANES FOR A RADIO FREQUENCY (RF) METAMATERIAL ANTENNA SEGMENT", which is incorporated by reference in its entirety.

FIELD OF THE DISCLOSURE

Embodiments of the present disclosure are related to wireless communication; more particularly, to power planes for radio frequency (RF) antenna elements of an antenna.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Some metasurface antennas using multiple bands and/or operating at high frequencies, such as Ka frequency, require many radio frequency (RF) metamaterial antenna elements for their operation. Moreover, some RF metamaterial-based antennas use more complex RF antenna element circuitry with multiple transistors, capacitors, timing signals and DC voltage sources. The area required to route control signals and DC voltages sources to the RF element driver circuits becomes too large for that kind of high-density designs. Furthermore, the minimum linewidth and gap between lines that can be used for such routing are limited by the process technology capability.

SUMMARY

A radio-frequency (RF) antenna and method for using the same are disclosed. In some embodiments, an antenna includes an array of RF radiating antenna elements, a plurality of RF antenna element driving circuits coupled to the array of RF radiating antenna elements to supply tuning voltages to the RF radiating antenna elements, and one or more metal power planes, each of the one or more metal power planes coupled to supply a common voltage to two or more of the plurality of RF antenna driving circuits.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
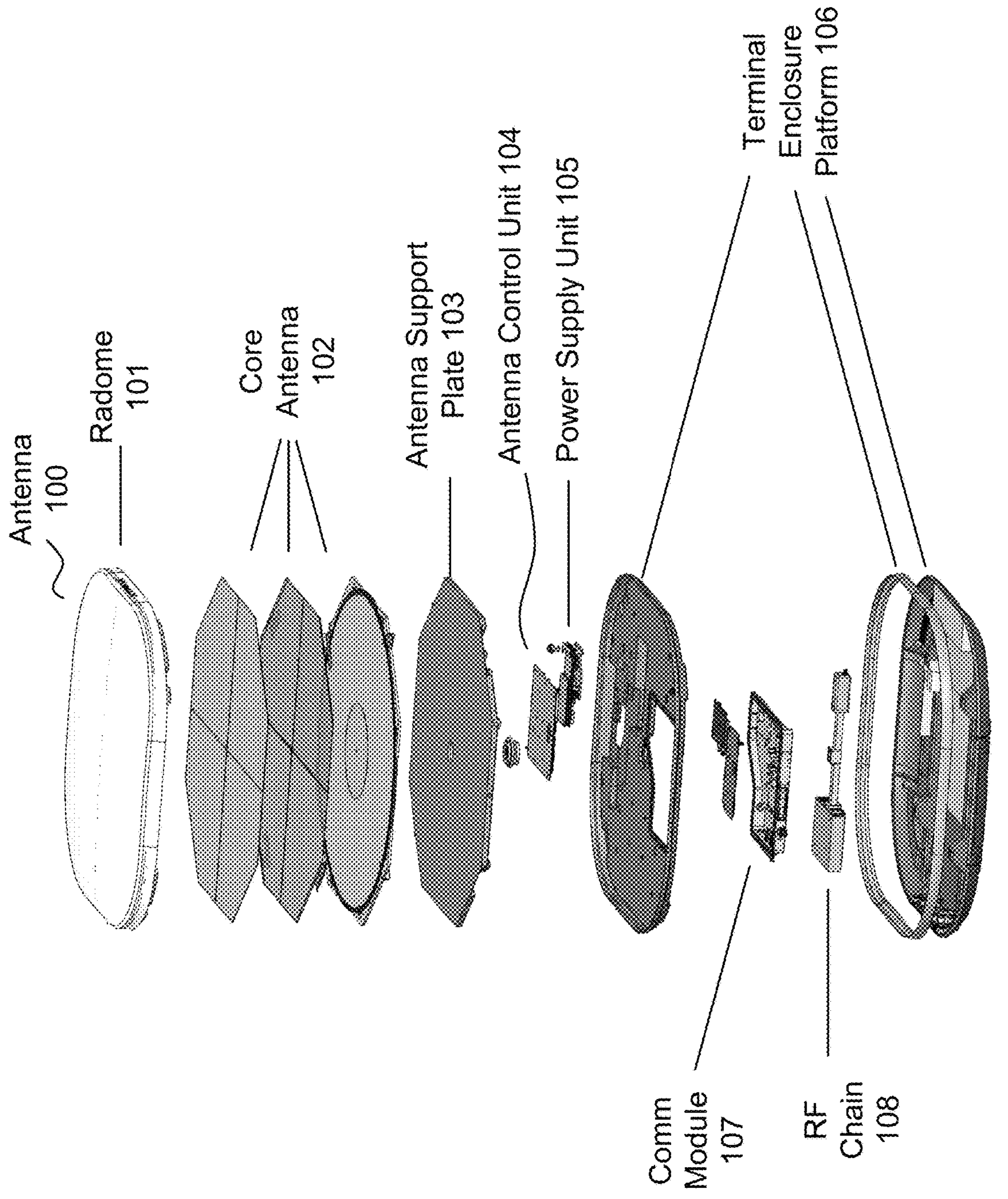
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Embodiments described herein include an antenna having a reduced number of routing lines. In some embodiments, the antenna is part of a satellite user terminal. In some embodiments, the antenna is a metamaterial antenna with radio-frequency (RF) radiating antenna elements such as, for example, described below. In some embodiments, the antenna includes drive circuitry for driving the antenna elements. In some embodiments, the drive circuitry uses transistor or other circuitry to drive voltage to the antenna elements. Embodiments disclosed herein includes method for decreasing the number of routing lines for the drive circuitry. For example, in some embodiments, the drive circuitry includes an active thin-film transistor (TFT) matrix for driving antenna elements of an array of RF radiating antenna elements in a metamaterial antenna, and using the techniques disclosed herein can reduce the number routing lines needed for supplying signal to and/or from the drive circuitry.

One technique disclosed herein to reduce the congestion will be moving some of the lines (e.g., metal routing lines) to different metal layers. In some embodiments, the different metal layers are power planes. Thus, in some embodiments, the reduction in routing lines is achieved by replacing direct current (DC) routing lines with power planes. In some embodiments, the power planes are in parallel to with iris metal layer for forming irises (slots) of the RF radiating antenna elements. An example of this metal layer is described in more detail below.

The following disclosure discusses examples of antenna embodiments followed by examples of power planes being used in place of routing lines in an antenna.

Examples of Antenna Embodiments

The techniques described herein may be used with a variety of flat panel satellite antennas. Embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

In some embodiments, the antenna aperture having the one or more arrays of antenna elements is comprised of multiple segments that are coupled together. In some embodiments, when coupled together, the combination of the segments form groups of antenna elements (e.g., closed concentric rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Pat. No. 11,489,266, entitled "Metasurface Antennas Manufactured with Mass Transfer Technologies," issued Nov. 1, 2022. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QoS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
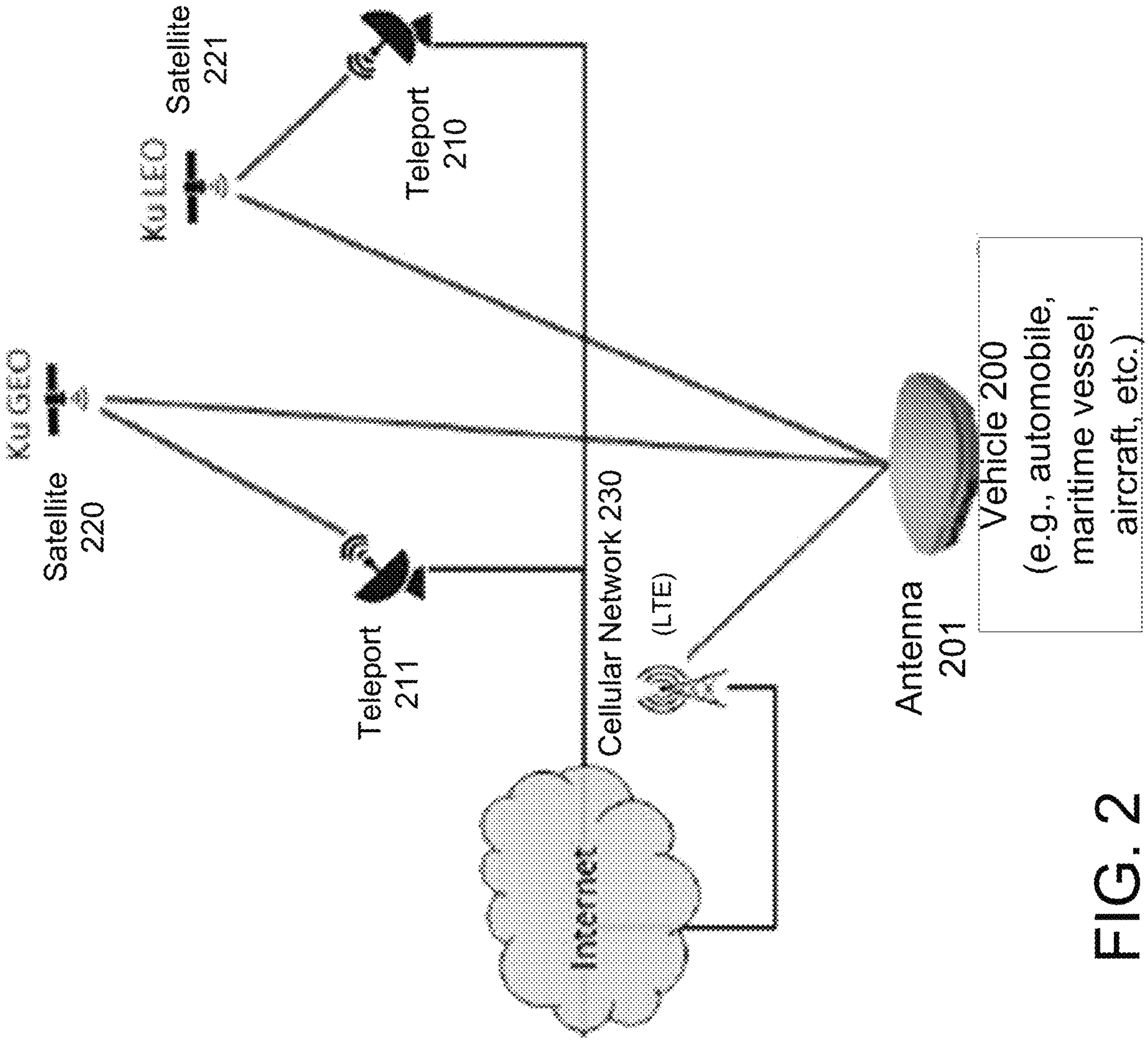
FIG. 2 illustrates an example of a communication system that includes one or more antennas described herein.

FIG. 2 illustrates an example of a communication system that includes one or more antennas described herein. Referring to FIG. 2, vehicle 200 includes an antenna 201. In some embodiments, antenna 201 comprises antenna 100 of FIG. 1.

In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause, or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communicate with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. patent Ser. No. 16/750,439, entitled "Multiple Aspects of Communication in a Diverse Communication Network", and filed Jan. 23, 2020.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections.

In some embodiments, antenna 201 comprises a metasurface RF antenna having multiple RF radiating antenna elements that are tuned to desired frequencies using RF antenna element drive circuitry. The drive circuitry can include a drive transistor (e.g., a thin film transistor (TFT) (e.g., CMOS, NMOS, etc.), low or high temperature polysilicon transistor, memristor, etc.), a Microelectromechanical systems (MEMS) circuit, or other circuit for driving a voltage to an RF radiating antenna element. In some embodiments, the drive circuitry comprises an active-matrix drive. In some embodiments, the frequency of each antenna element is controlled by an applied voltage. In some embodiments, this applied voltage is also stored in each antenna element (pixel circuit) until the next voltage writing cycle.

Power Planes for an RF Metamaterial Antenna

Embodiments described herein include antennas that use power planes to provide one or more voltages to RF element driving circuits or other circuits of an antenna layout. In some embodiments, the voltage supplied by each power plane is a constant, direct conversion (DC) voltage. The constant voltage can be used to keep one or more nodes in each of the RF element driving circuits or other circuits at a constant voltage.

In some embodiments, the power planes replace the number of routing lines that would have been used to route voltages to the RF element driving circuits and/or RF metamaterial antenna elements. This usage of power planes instead of routing lines is important for designs with high RF antenna element density and limited layout space. In some embodiments, the antenna includes the metal power planes in parallel geometrically with an iris metal layer forming a part of the RF antenna elements, separated with a passivation layer, to supply DC voltages to RF element driving circuits and/or RF metamaterial antenna elements.

If a DC voltage provided by the RF element driving circuit and required for the antenna element (to drive the antenna element) is being applied using a power plane metal layer, then no patterning similar to routing lines carrying array addressing signals is needed. This provides additional routing flexibility for the order in which RF elements are connected to the power plane metal layer (though the RF element driving circuit) as it is not carrying an array addressing signal so it does not need to follow a particular route or path.

Figure 3:
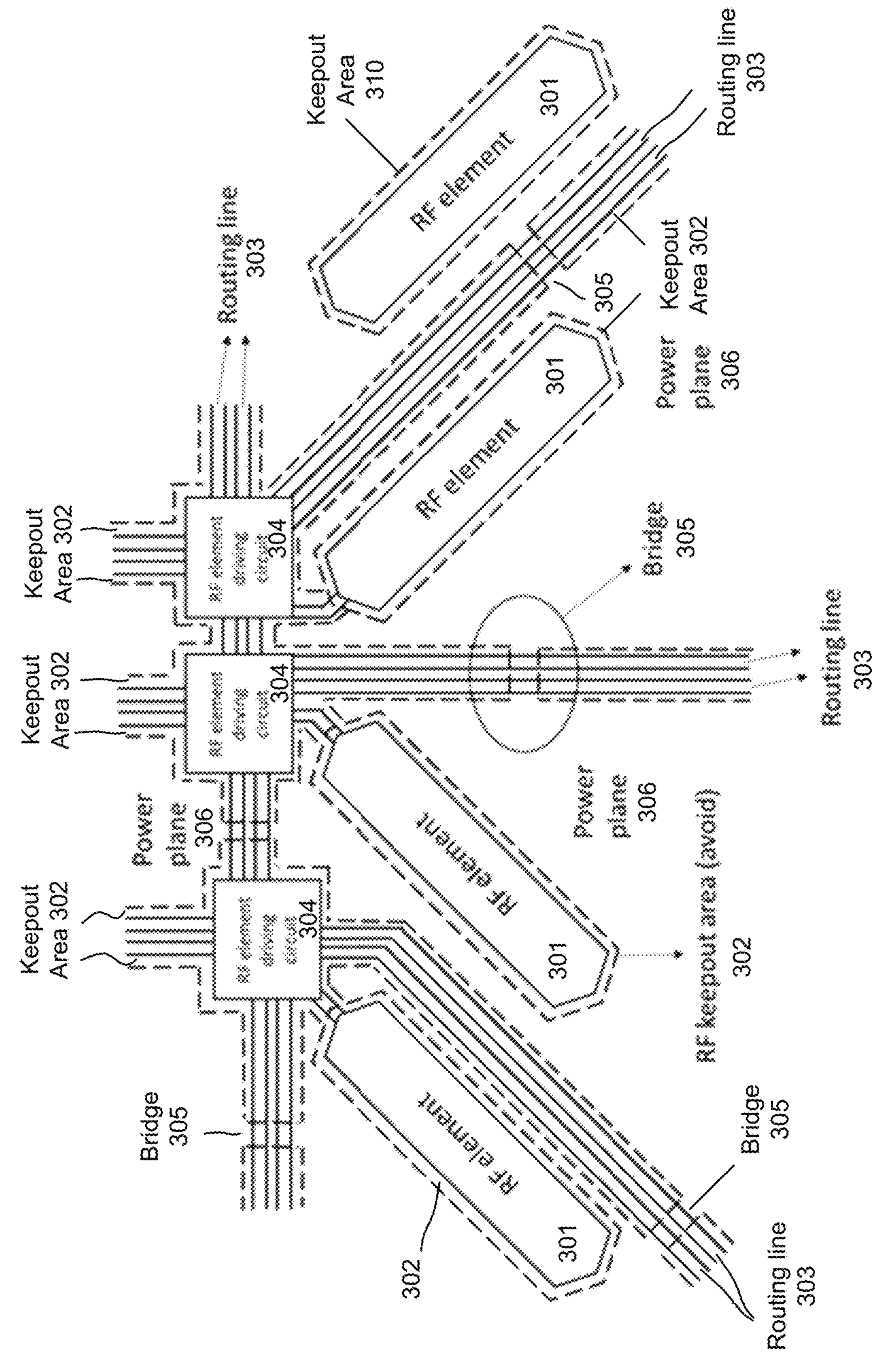
FIG. 3 illustrates a portion of a radio-frequency (RF) metamaterial antenna having power planes with RF antenna elements, keepout areas for each of the RF elements, routing lines and RF element driving circuits.

FIG. 3 illustrates some embodiments of a portion of an antenna aperture having power planes to supply voltages to RF antenna element driving circuits of an RF metamaterial antenna. In some embodiments, the antenna is a metasurface antenna as described above. Referring to FIG. 3, the antenna aperture includes RF antenna elements 301, keepout areas 302 for each of the RF antenna elements 301, routing lines 303 and RF antenna element driving circuits 304. In some embodiments, each of the RF antenna elements 301 is electrically coupled to receive a drive voltage and/or other signals from at least one of the RF element driving circuits 304. In some embodiments, RF antenna elements 301 comprise RF radiating metamaterial antenna elements. In some embodiments, routing lines 303 comprise control signal, timing signal, and/or data signal routing to and/or between RF antenna element driving circuits 304. Note that there can be other routing lines to route signals to other circuit elements in the antenna.

As shown in FIG. 3, the antenna aperture includes multiple power plane segments 306. The areas for power plane segments 306 are defined by the dashed lines. In some embodiments, power plane segments 306 are all part of the same power plane (e.g., one piece of metal). In some other embodiments, power plane segments 306 are coupled to and electrically connected to each other to form a single power plane. In some embodiments, the power planes comprise an interconnected mesh of metal lines. Such an implementation reduces the potential for shorting and reduces the metal area.

In some embodiments, power plane segments 306 transfer a common, constant voltage to all of RF antenna driving circuits electrically connected to one of power plane segments 306. In some embodiments, the RF antenna element driving circuits 304 supply drive, or tuning, voltages to the RF radiating antenna elements 301, and each of power plane segments 306 is coupled to supply a common voltage to multiple RF antenna driving circuits 304. In some embodiments, power plane segments 306 are used only for signals transferring a direct current (DC), common voltage at the same time in place of separate routing lines like routing lines 303. This reduces the number of routing lines running between antenna elements in the aperture.

In some embodiments, one of power plane segments 306 is electrically connected to an RF antenna element driving circuit 304 using a via structure to at least a portion of RF element driving circuit 304. In some embodiments, the via structure could be a single via or a structure of multiple vias to form a contact between top and bottom metal layers using intermediate metal layers to bridge between them. In some embodiments, each of RF antenna driving circuits 304 has a footprint and the via structure extends below the footprint and extends from that point over to one of one of the power plane segments. In some other embodiments, one of power plane segments 306 is electrically connected to an RF antenna element driving circuit 304 using a via structure that is located proximate to, or near, RF antenna element driving circuit 304. In some embodiments, each of RF antenna element driving circuits 304 has a footprint and the via structure extends below its footprint. In this case, the via structure can electrically connect one of power plane segments 306 to an additional metal layer at a node, which is routed into RF antenna element driving circuit 304 from that point. This additional metal layer can be a routing metal layer (e.g., routing layer 503 of FIG. 5) or the additional metal layer can be a metal plate (e.g., a capacitor plate, etc.) and can be dependent upon the layout of the RF antenna element driving circuit (e.g., the TFT box layout in a matrix drive, etc.).

In some other embodiments, the node is within RF antenna element driving circuit 304 and a part of power plane 306 extends into the area of RF antenna element driving circuit 304 to electrically connect one of power plane segments 306 directly into RF antenna element driving circuit 304 without the use of routing metal from outside RF antenna element driving circuit 304. This could allow the via structure to be placed in an advantageous place in the RF element driving circuit, such as on a node of the circuit, without creating an extra wire.

In some embodiments, the power plane is electrically connected to the RF antenna element (pixel circuit) using a metal extension (e.g., like a finger) on the same metal layer near the driving circuitry of the RF element driving circuit that provides a drive voltage to the RF antenna element. In some embodiments, this is accomplished by modifying the keepout layer in each RF element drive circuits to bring an extension of the power plane into the RF element driving circuit box. For example, the keepout area in FIG. 3 can be modified so that the power plane is not completely excluded from the RF element driving circuit.

Figure 4A:
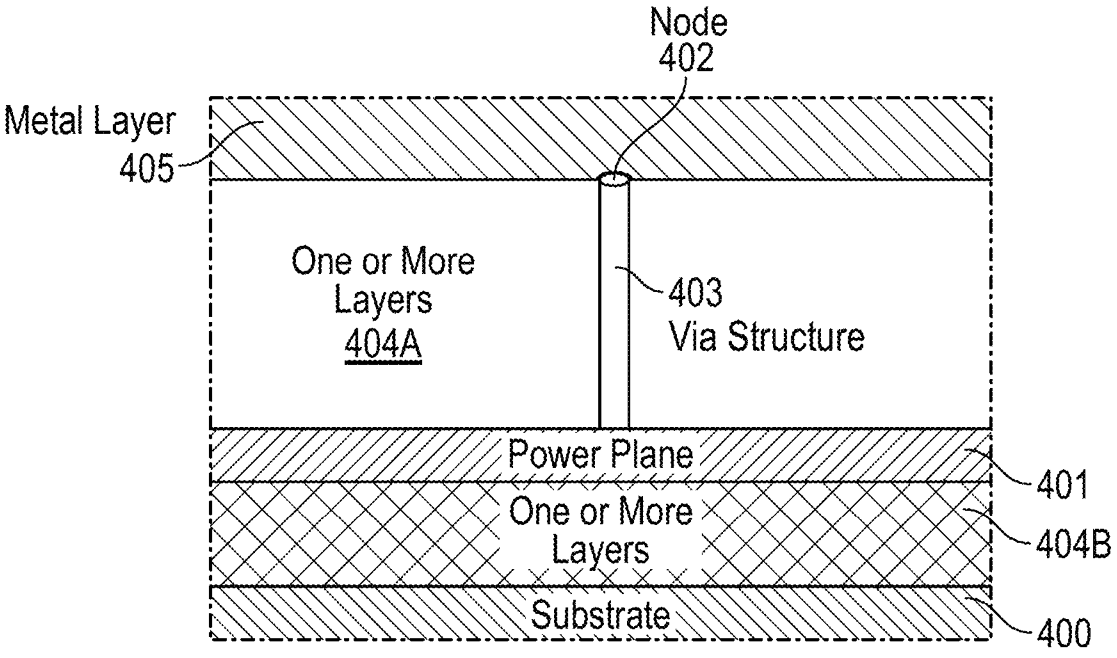
FIG. 4A illustrates an example of a via structure electrically connecting an RF antenna element driving circuit to a power plane.

FIG. 4A illustrates an example of a via structure electrically connecting an RF antenna element driving circuit (or RF antenna element) to a power plane. Referring to FIG. 4A, power plane 401 is connected electrically to node 402 that is coupled to a RF antenna element driving circuit. In some embodiments, power plane 401 comprises a metal layer. In some embodiments, there are one or more layers 404A between power plane 401 and node 402 through which via structure 403 extends. Via structure 403 can include metal and/or dielectric layers. In some embodiments, the metal layer of power plane 401 is on top of (e.g., deposited on) one or more other layers 404B (e.g., semiconductor fabrication processing layers). Also, in some embodiments, if there are multiple power plane metal layers, then the via structure can have multiple vias. This is particularly true in the case that the stack up of has multiple layers of metals and dielectrics, or the dielectrics become thicker (e.g., to prevent shorts, to prevent cross talk), one might need to stack or step vias to manage the structure area and/or obey design rules. Node 402 is coupled to an RF element driving circuit via metal layer 405. Metal layer 405 can comprise one of the metal layers used for routing.

Figure 4B:
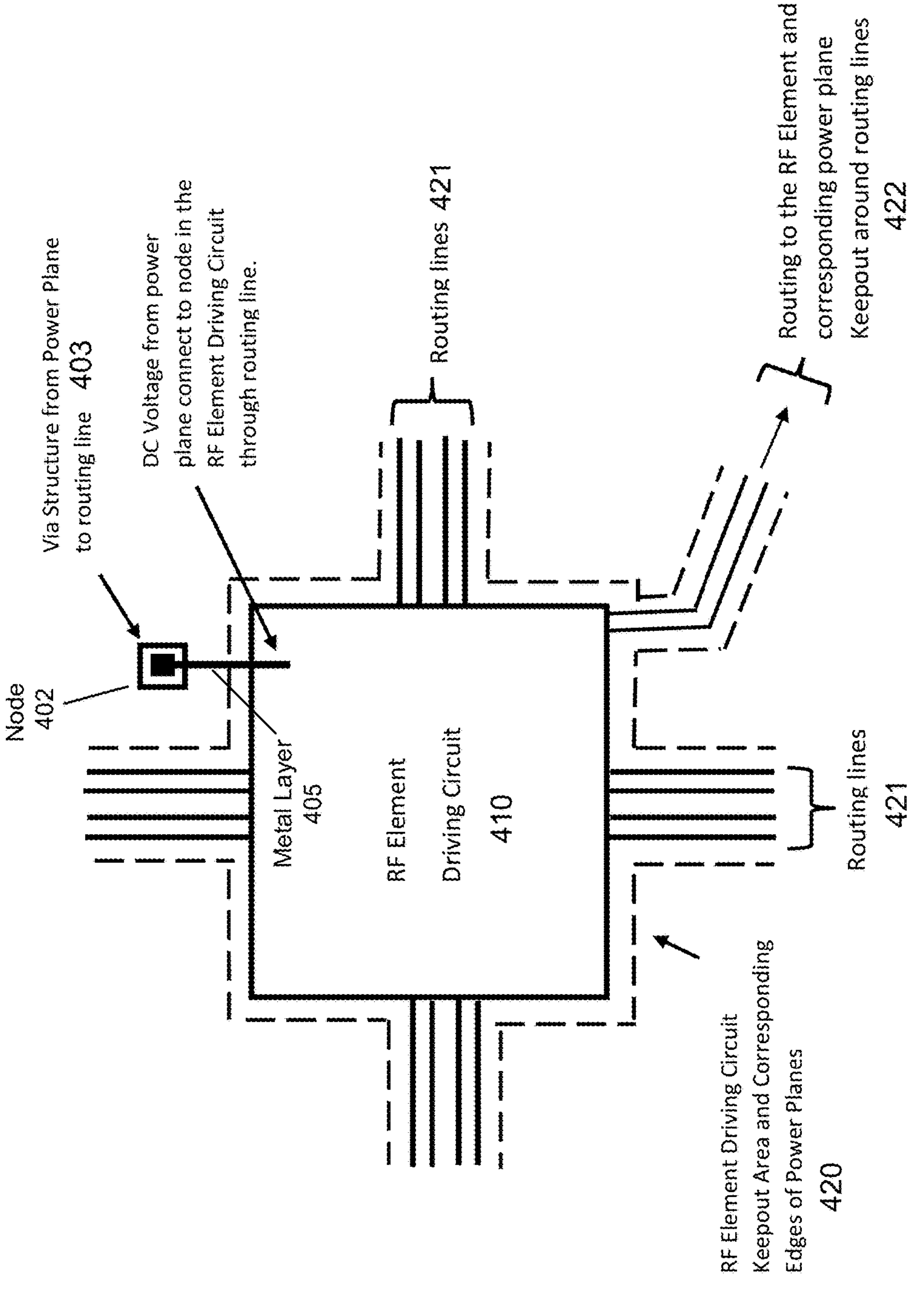
FIG. 4B illustrates an example of electrically connecting a node in an RF antenna element driving circuit to a power plane using a metal extension.

FIG. 4B also shows the coupling arrangement in which a node is not within the RF antenna element driving circuit and is coupled to the RF antenna element driving circuit via a metal layer (e.g., routing lines, capacitive plate, etc.). Referring to FIG. 4B, a node 402 of an RF element driving circuit 410 is coupled to a via structure 403 using a metal layer 405. Also shown in FIG. 4B, routing lines 421 are coupled to RF element driving circuit 410 to transfer control signal, timing signal, and/or data signal routing to and/or from RF antenna element driving circuit 410. A keepout area 420 is around RF element driving circuit 410 and defines an edge of the power plane. Routing lines 422 route signals (e.g., voltage signals) to an RF antenna element. Power plane keepout area 420 extends around routing lines 422.

Using via structure 403 and metal layer 405, a DC voltage can be transferred from the power plane to a node in RF element driving circuit 410. As discussed above, metal layer 405 can comprise a routing metal layer, capacitive plate, or any other technique known to those skilled in the art to make an electrical connection for transferring a voltage.

Figure 4C:
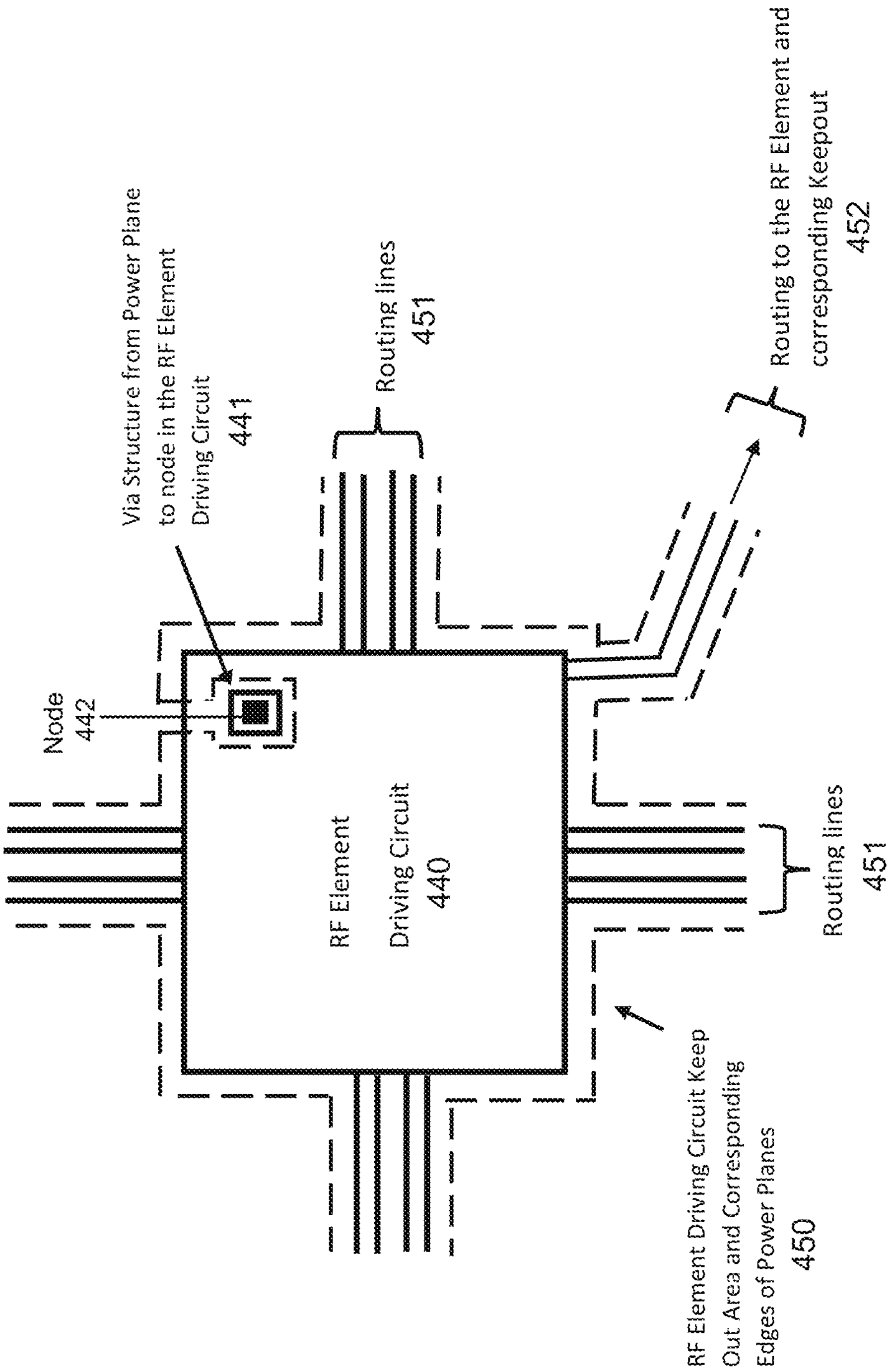
FIG. 4C illustrates an example of a metal extension electrically connecting a node in an RF antenna element driving circuit to a power plane.

FIG. 4C illustrates an example of a metal extension electrically connecting a node in an RF antenna element driving circuit to a power plane using a metal extension. Referring to FIG. 4C, the power plane extends into the RF element drive circuit to enable a connection of the power plane through a via structure 441 to a node 442 in RF element driving circuit 440. Also shown in FIG. 4C, routing lines 451 are coupled to RF element driving circuit 440 to transfer control signal, timing signal, and/or data signal routing to and/or from RF antenna element driving circuit 440. A keepout area 450 is around RF element driving circuit 440 and defines an edge of the power plane. Routing lines 452 route signals (e.g., voltage signals) to an RF antenna element. Power plane keepout area 450 extends around routing lines 452.

Referring back to FIG. 3, keepout area 302 includes an area around signal routing, such as routing lines 303, around RF antenna elements 301, and around RF element driving circuits 304 that are avoided when for the routing of signals. Other keepout areas include keepout area 310. In some embodiments, there are instances when a signal(s) is routed through these keepout areas due to limited availability of other practical and/or potential routing areas. In some embodiments, once keepout areas around circuit elements are defined, they can be coupled together and combined to create the voltage/power plane in a straightforward manner.

Figure 5:
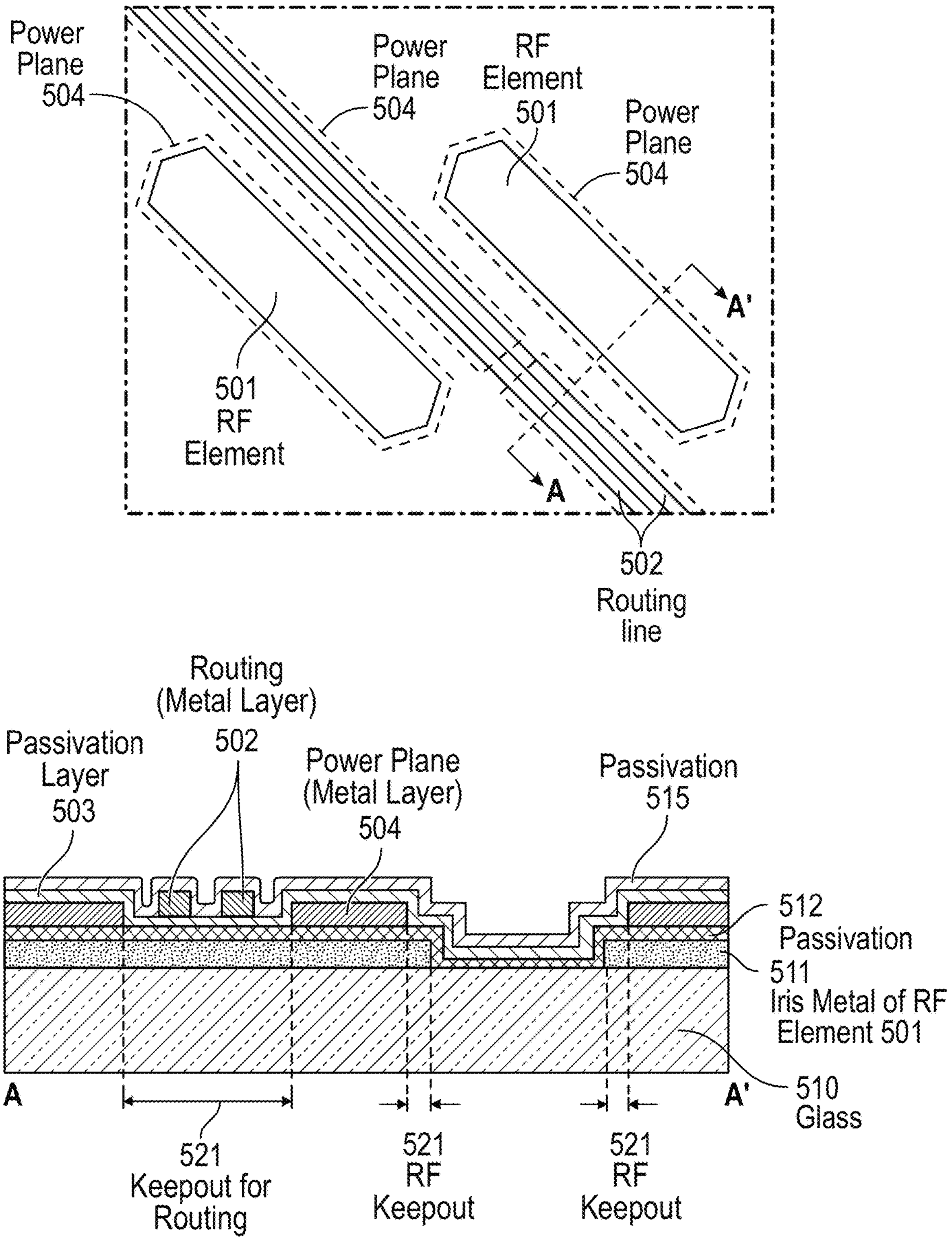
FIG. 5 illustrates a cross-sectional view of some embodiments of an antenna with a power plane structure along with an RF element and routing lines.

One drawback of using an additional power plane metal layer would be increased parasitic capacitance between routing lines and this power plane metal layer. In some embodiments, the parasitic capacitance is reduced, and potentially minimized, using one or more methods. In one method, the thickness of the passivation layer between the power plane and the routing lines is increased to reduce the parasitic capacitance. In another method, the overlap area between the routing lines and the power plane is reduced (e.g., minimized) as shown in FIG. 5. The overlap area is limited to the "bridging" locations, referred to as bridge 305 in FIG. 3, where two power planes 306 on each side of the routing line are connected with a "bridge". In some embodiments, bridge 305 goes over the routing lines 303. In some other embodiments, bridge 305 goes under the routing lines 303. Bridges 305 can be electrically connected to the power plane segments in a number of ways. For example, one or more via structures can be used to couple the end of each bridge to a power plane segment.

In some embodiments, the process for creating a power plane from multiple power plane segments includes defining keepout areas to define a power plane, creating a pair of via structures, coupling on end of each via structure of the pair to a power plane segment, and coupling the other end of each via structure using a bridge to form the power plane. In some embodiments, the path goes from a first power plane segment layer using a first via structure to another metal layer, and then with the use of routing on that layer as the bridge, the path goes back through the via structure to the next power plane segment layer. The result is that the bridge is on the metal layer that is connected to the via structures. For example, to create three power planes using power planes segments on a single layer, a connected string of power planes segments is crossed. Here, vias are used to go to another layer to route across the connected power plane segments, and then back to the power plane layer to make the wanted connections.

To further reduce the parasitic capacitance and to eliminate and effect on the antenna performance, power planes 306 do not overlap with the iris of RF antenna element 301 defined in the iris metal layer that form irises for the RF antenna elements 301, as well as RF element driving circuit 304. A keepout distance is defined to determine the gap between this metal power plane and the RF element.

In some embodiments, multiple power planes are added to the antenna aperture structure by alternating metal layers and passivation layers that are deposited. FIG. 5 illustrates a cross-sectional view of some embodiments of a part of an antenna with a power plane structure along with an RF element and routing lines shown in FIG. 3. Referring to FIG. 5, the cross-section A-A' through an RF antenna element 501, routing lines 502, and several power plane segments, such as power plane segments 504. In some embodiments, power plane segments 504 are all part of the same power plane. In some embodiments, power plane segments 504 are all individual metal segments electrically connected (e.g., using bridging or known electrical connection techniques) to each other for form a single power plane.

In the cross section, a number of layers are on top of a glass, or other substrate, 510. In some embodiments, these layers are deposited onto glass substrate 510 using semiconductor manufacturing fabrication processes. These layers include an iris metal layer 511 deposited onto glass substrate 510, which form the iris for one of the RF elements (e.g., RF element 301 of FIG. 3). A passivation layer 512 is deposited on top of iris metal layer 511. Power plane segments 504 are deposited on top of passivation layer 512. In some embodiments, power plane segments 504 are metal layers and are deposited on the same layer of a semiconductor fabrication process. Alternatively, power plane segments 504 are deposited on different metal layers of a semiconductor fabrication process and are coupled together using via structures and other metal routing layers.

A passivation layer 513 is deposited over the other layers including power plane segments. Routing lines 502 are deposited on passivation layer 513. In some embodiments, routing lines 514 are metal layers. A passivation layer 515 is deposited over the other layers including routing lines 514.

The cross section also shows regions for RF keepout areas 521 are all part of the same RF keepout area, and includes a keepout region for routing, including routing lines 502 and keepout areas around RF element 501.

When fabricating the stack up such as shown in FIG. 5 (and FIG. 6 below), the results is a stack up that resembles how a printed circuit board (PCB) is stacked up. This is advantageous in integrating the use of power planes in a TFT stack-up. However, in contrast to PCBs and the way a PCB stack up does this is through layers of prepreg (dielectric material) and the core material of the board in a multi-core PCB stack-up, in some embodiments, multiple power planes are electrically isolated from one another with layers of passivation (e.g., thin film passivation layers). That is, apart from whether routing lines are isolated with passivation from iris metal in an iris metal plane.

In some embodiments, multiple power planes are included in the antenna aperture and each of the power planes provides a different constant voltage. In some embodiments, the power planes comprise power plane segments of the same power plane that has been divided into multiple parts. In some other embodiments, one power plane on the same metal layer (deposition layer) is divided into multiple power plane segments as part of the fabrication process. In some embodiments, the power plane is divided into power plane segments along one or more gate routing paths that is used to transfer gate routing voltages, and not the source routing paths that route source voltages.

Two or more of these power plane segments could be physical coupled together (e.g., via bridging as discussed above) so that they are electrically connected. While divisions can occur along certain routing paths, these bridges can still be used to couple and electrically connect power plane segments that transfer the same voltage.

In some embodiments, multiple power planes are stacked vertically on top of each other. For example, in a case where three DC voltages are to be connected to the RF element driving circuit, there is a power plane for each of these voltages. Alternatively, a power plane layer can be split into two planes (e.g., see FIG. 6) on one layer, and another power plane stacked above or below it. As a further alternative, a power plane layer can be split into 3 planes so one layer could supply all three voltages.

Figure 6:
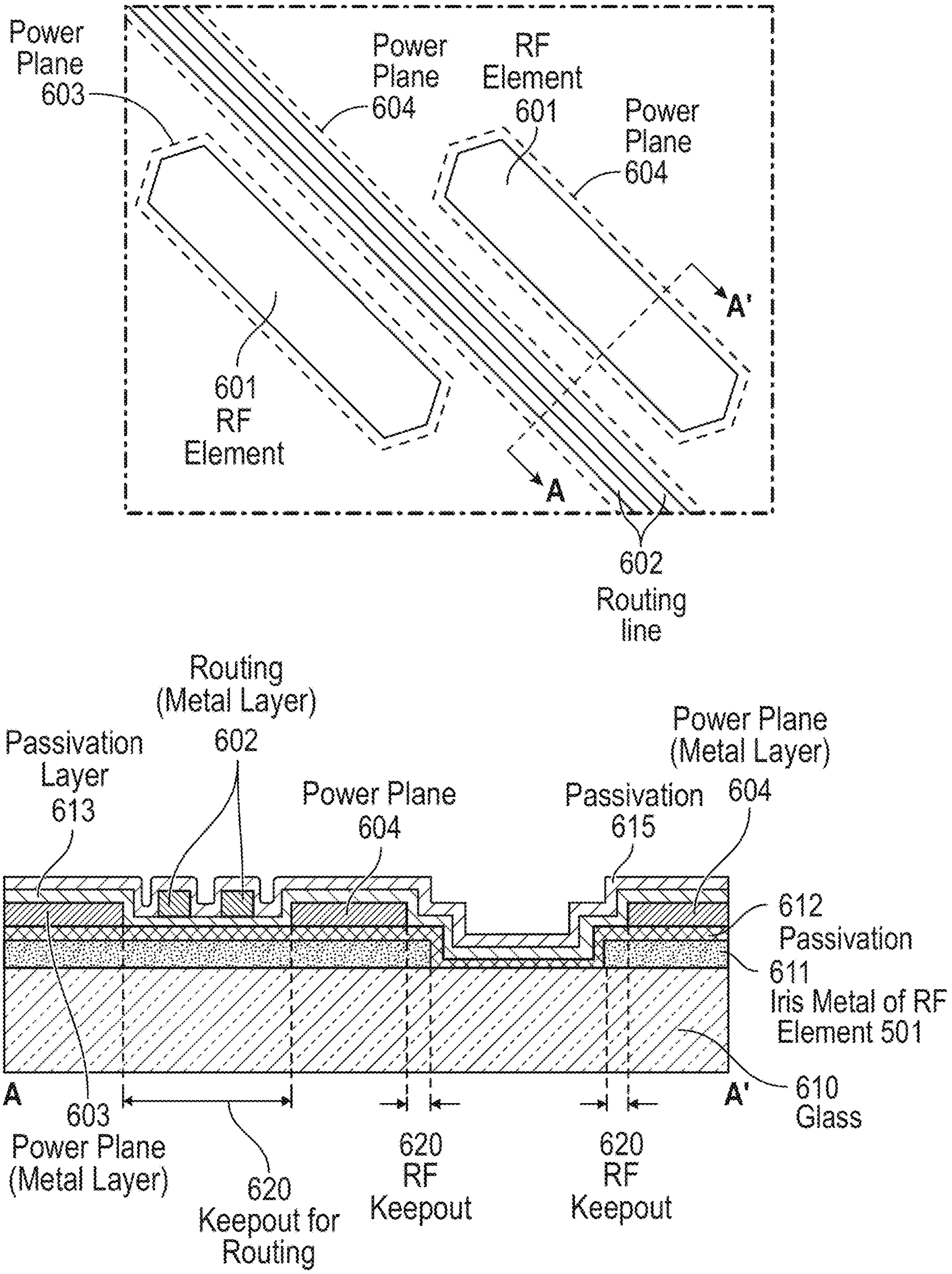
FIG. 6 illustrates an example of some embodiments in which bridges are maintained along the source routing and bridges are eliminated across the gate routing (or vice versa).

FIG. 6 illustrates an example of some embodiments in which all the bridges are maintained along the source routing and all the bridges shown in FIGS. 3 and 5 are eliminated across the gate routing (or vice versa). In this case, the metal layer in which the power plane is formed would be split into multiple parts (e.g., the plane in split in two parts).

Referring to FIG. 6, the bridging shown in FIGS. 3 and 5 have been eliminated so that power plane 504 is separate from power plane 503, which would be a power plane on the opposite side of the routing line. Referring to FIG. 6, the cross-section A-A' through an RF antenna element 601, routing lines 602, and several power planes, such as power planes 603 and 604. In some embodiments, power planes 603 and 604 are split using the keepout areas associated with the routing lines 602. In some embodiments power planes 603 and 604 may supply two different common voltages to the RF element driving circuits. In some embodiments, splitting the power plane into power planes 603 and 604 reduces the number of power planes required to supply common voltages to the RF element driving circuits.

In the cross section, several layers are on top of a glass, or other substrate, 610. In some embodiments, these layers are deposited onto glass substrate 610 using semiconductor manufacturing fabrication processes. These layers include an iris metal layer 611 deposited onto glass substrate 610, which form the iris for one RF antenna element 601. A passivation layer 612 is deposited on top of iris metal layer 611. Power planes 603 and 604 are deposited on top of passivation layer 612. In some embodiments, power planes 603 and 604 are metal layers and are deposited on the same layer of a semiconductor fabrication process. A passivation layer 613 is deposited over the other layers including power plane segments. Routing lines 602 are deposited on passivation layer 613. In some embodiments, routing lines 602 are metal layers. A passivation layer 615 is deposited over the other layers including routing lines 614. The cross section also shows regions for RF keepout areas 620 are all part of the same RF keepout area, and includes a keepout region for routing, including routing lines 602 and keepout areas around RF element 601.

In the case of multiple power planes, the shape and/or dimensions of the keepout area (and thus, the shape of a power plane itself) can be different for each power plane.

Note that, in some embodiments, the power planes terminate at the edges of the RF element array, and a connection of the power planes to the DC voltages occurs through routing from DC voltage buses outside of the RF element array region to the edge power plane segments.

Thus, by utilizing metal power planes in place of routing lines to provide a constant voltage to locations within an antenna aperture, congestion in an antenna having antenna elements (e.g., RF radiating antenna elements) can be reduced.

There are a number of example embodiments described herein.

Example 1 is an antenna comprising: an array of radio-frequency (RF) radiating antenna elements; a plurality of RF antenna element driving circuits coupled to the array of RF radiating antenna elements to supply tuning voltages to the RF radiating antenna elements; and one or more metal power planes, each of the one or more metal power planes coupled to supply a common voltage to two or more of the plurality of RF antenna driving circuits.

Example 2 is the antenna of example 1 that may optionally include that each one or more metal power planes is electrically connected to two or more of the plurality of RF antenna driving circuits using vias.

Example 3 is the antenna of example 2 that may optionally include that each of the plurality of RF antenna driving circuits has a footprint and the via extends from a location within the footprint to one of the one or more metal power planes.

Example 4 is the antenna of example 2 that may optionally include that at least one RF antenna driving circuit of the plurality of RF antenna driving circuits is electrically connected to one metal power plane of said each one or more metal power planes by coupling an extension of the one metal power plane into the at least one RF antenna driving circuit.

Example 5 is the antenna of example 1 that may optionally include that the voltage of each of the one or more metal power planes is operable to transfer a direct current (DC) voltage to all of RF antenna driving circuits electrically connected to said each of the one or more metal power planes.

Example 6 is the antenna of example 1 that may optionally include a substrate; and a plurality of layers deposited on top of the substrate, wherein the plurality of layers includes an iris metal layer coupled to the substrate and containing irises, each of the irises being part of one of the RF radiating antenna elements, and one or more additional layers on the iris metal layer, wherein the one or more metal power planes are on top of the one or more additional layers.

Example 7 is the antenna of example 6 that may optionally include that the one or more layers comprises: at least one passivation layer between the iris metal layer and the one or more routing lines, and further wherein the one or more metal power planes geometrically in parallel with the iris metal layer.

Example 8 is the antenna of example 1 that may optionally include that the one or more metal power planes are not beneath routing lines routing variable voltages to one RF antenna driving circuit of the plurality of RF antenna driving circuits.

Example 9 is the antenna of example 1 that may optionally include a bridge to electrically connect a pair of power plane segments on opposite sides of a set of one or more routing lines coupled to one or more of the RF antenna driving circuits of the plurality of RF antenna driving circuits.

Example 10 is the antenna of example 1 that may optionally include that the RF radiating antenna elements comprise metamaterial antenna elements.

Example 11 is the antenna of example 10 that may optionally include that the RF radiating antenna drive circuits are part of the active-matrix drive.

Example 12 comprises an antenna comprising: an array of radio-frequency (RF) radiating antenna elements; a plurality of RF antenna element driving circuits coupled to the array of RF radiating antenna elements to supply tuning voltages to the RF radiating antenna elements; one or more metal power planes, each of the one or more metal power planes coupled to supply a common Direct Current (DC) voltage to two or more of the plurality of RF antenna driving circuits, wherein said each one or more metal power planes is electrically connected to two or more of the plurality of RF antenna driving circuits using via structures; and a bridge to electrically connect a pair of power plane segments on opposite sides of a set of one or more routing lines coupled to one or more of the RF antenna driving circuits of the plurality of RF antenna driving circuits.

Example 13 is the antenna of example 12 that may optionally include that each of the plurality of RF antenna driving circuits has a footprint and the via extends from a location within the footprint to one of the one or more metal power planes.

Example 14 is the antenna of example 12 that may optionally include that the voltage of each of the one or more metal power planes is operable to transfer the DC voltage to all of RF antenna driving circuits electrically connected to said each of the one or more metal power planes.

Example 15 is the antenna of example 12 that may optionally include that the one or more metal power planes are not beneath routing lines routing variable voltages to one RF antenna driving circuit of the plurality of RF antenna driving circuits.

Example 16 is a satellite communications terminal comprising an antenna having: a plurality of metal power planes to supply a common voltage; an array of radio-frequency (RF) radiating antenna elements; a plurality of RF antenna element driving circuits coupled to the array of RF radiating antenna elements to supply tuning voltages to the RF radiating antenna elements, each of the plurality of RF antenna element driving circuits having one or more nodes, wherein the one or more nodes in the plurality of RF antenna element driving circuits maintained at one or more constant voltages by coupling each the one or more nodes to one of the plurality of power planes.

Example 17 is the antenna of example 16 that may optionally include a substrate; and a plurality of layers deposited on top of the substrate, wherein the plurality of layers includes an iris metal layer coupled to the substrate and containing irises, each of the irises being part of one of the RF radiating antenna elements, and one or more additional layers on the iris metal layer, wherein the one or more metal power planes are on top of the one or more additional layers and are in parallel geometrically with the iris metal layer, and further wherein at least one passivation layer between the iris metal layer and the one or more routing lines.

Example 18 is an antenna comprising: an array of radio-frequency (RF) radiating antenna elements; a plurality of RF antenna element driving circuits coupled to the array of RF radiating antenna elements to supply tuning voltages to the RF radiating antenna elements; and one or more metal power planes, each of the one or more metal power planes coupled to supply a common voltage to two or more of the plurality of RF antenna driving circuits, wherein the one or more power planes are electrically isolated from each other.

Example 19 is the antenna of example 18 that may optionally include that the two or more power planes are electrically isolated from each other by one or more thin film passivation layers.

Example 20 is the antenna of example 8 that may optionally include that each of the two or more power planes comprises power plane segments of one power plane that has been that have been connected into two or more different power planes connected to two or more different common voltages.

Example 21 is the antenna of example 18 that may optionally include a stack that includes the one or more passivation layers, routing lines, and iris metal in an iris metal layer for forming a portion of the RF antenna elements, wherein the routing lines are coupled to the RF antenna driving circuits and are isolated with passivation from iris metal in an iris metal plane.

All the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:

an array of radio-frequency (RF) radiating antenna elements;

a plurality of RF antenna element driving circuits coupled to the array of RF radiating antenna elements to supply tuning voltages to the RF radiating antenna elements; and one or more metal power planes, each of the one or more metal power planes coupled to supply a common voltage to two or more of the plurality of RF antenna driving circuits, wherein said each one or more metal power planes is electrically connected to two or more of the plurality of RF antenna driving circuits using vias.

2. The antenna of claim 1 wherein each of the plurality of RF antenna driving circuits has a footprint and the via extends from a location within the footprint to one of the one or more metal power planes.

3. The antenna of claim 1 wherein at least one RF antenna driving circuit of the plurality of RF antenna driving circuits is electrically connected to one metal power plane of said each one or more metal power planes by coupling an extension of the one metal power plane into the at least one RF antenna driving circuit.

4. The antenna of claim 1 wherein the voltage of each of the one or more metal power planes is operable to transfer a direct current (DC) voltage to all of RF antenna driving circuits electrically connected to said each of the one or more metal power planes.

5. The antenna of claim 1 further comprising:

a substrate; and a plurality of layers deposited on top of the substrate, wherein the plurality of layers includes an iris metal layer coupled to the substrate and containing irises, each of the irises being part of one of the RF radiating antenna elements, one or more additional layers on the iris metal layer, wherein the one or more metal power planes are on top of the one or more additional layers.

6. The antenna of claim 5 wherein the one or more layers comprises:

at least one passivation layer between the iris metal layer and the one or more routing lines, and further wherein the one or more metal power planes geometrically in parallel with the iris metal layer.

7. The antenna of claim 1 wherein the one or more metal power planes are not beneath routing lines routing variable voltages to one RF antenna driving circuit of the plurality of RF antenna driving circuits.

8. The antenna of claim 1 further comprising a bridge to electrically connect a pair of power plane segments on opposite sides of a set of one or more routing lines coupled to one or more of the RF antenna driving circuits of the plurality of RF antenna driving circuits.

9. The antenna of claim 1 wherein the RF radiating antenna elements comprise metamaterial antenna elements.

10. The antenna of claim 9 wherein the RF radiating antenna drive circuits are part of the active-matrix drive.

11. An antenna comprising:

an array of radio-frequency (RF) radiating antenna elements;

a plurality of RF antenna element driving circuits coupled to the array of RF radiating antenna elements to supply tuning voltages to the RF radiating antenna elements;

one or more metal power planes, each of the one or more metal power planes coupled to supply a common Direct Current (DC) voltage to two or more of the plurality of RF antenna driving circuits, wherein said each one or more metal power planes is electrically connected to two or more of the plurality of RF antenna driving circuits using via structures; and a bridge to electrically connect a pair of power plane segments on opposite sides of a set of one or more routing lines coupled to one or more of the RF antenna driving circuits of the plurality of RF antenna driving circuits.

12. The antenna of claim 11 wherein each of the plurality of RF antenna driving circuits has a footprint and the via extends from a location within the footprint to one of the one or more metal power planes.

13. The antenna of claim 11 wherein the voltage of each of the one or more metal power planes is operable to transfer the DC voltage to all of RF antenna driving circuits electrically connected to said each of the one or more metal power planes.

14. The antenna of claim 11 wherein the one or more metal power planes are not beneath routing lines routing variable voltages to one RF antenna driving circuit of the plurality of RF antenna driving circuits.

15. A satellite communications terminal comprising an antenna having:

a plurality of metal power planes to supply a common voltage;

an array of radio-frequency (RF) radiating antenna elements;

a plurality of RF antenna element driving circuits coupled to the array of RF radiating antenna elements to supply tuning voltages to the RF radiating antenna elements, each of the plurality of RF antenna element driving circuits having one or more nodes, wherein the one or more nodes in the plurality of RF antenna element driving circuits maintained at one or more constant voltages by coupling each the one or more nodes to one power plane of the plurality of power planes.

16. The antenna of claim 15 further comprising:

a substrate; and a plurality of layers deposited on top of the substrate, wherein the plurality of layers includes an iris metal layer coupled to the substrate and containing irises, each of the irises being part of one of the RF radiating antenna elements, one or more additional layers on the iris metal layer, wherein the one or more metal power planes are on top of the one or more additional layers and are in parallel geometrically with the iris metal layer, and further wherein at least one passivation layer between the iris metal layer and the one or more routing lines.

17. An antenna comprising:

an array of radio-frequency (RF) radiating antenna elements, each of the RF radiating antenna elements having an iris;

a plurality of RF antenna element driving circuits coupled to the array of RF radiating antenna elements to supply tuning voltages to the RF radiating antenna elements; and two or more metal power planes, each metal power plane of the two or more metal power planes coupled to supply a common voltage to two or more of the plurality of RF antenna driving circuits without overlapping irises of the RF radiating antenna elements in the array of RF radiating antenna elements, wherein the two or more power planes are electrically isolated from each other.

18. The antenna of claim 17 wherein the two or more power planes are electrically isolated from each other by one or more thin film passivation layers.

19. The antenna of claim 17 wherein each of the two or more power planes comprises power plane segments of one power plane that has been that have been connected into two or more different power planes connected to two or more different common voltages.

20. The antenna of claim 17 further comprising a stack that includes the one or more passivation layers, routing lines, and iris metal in an iris metal layer for forming a portion of the RF antenna elements, wherein the routing lines are coupled to the RF antenna driving circuits and are isolated with passivation from iris metal in an iris metal plane.

* * * * *